United States Patent [19]

Feinbloom et al.

[11] 4,410,929
[45] Oct. 18, 1983

[54] LINEAR MOTION SWITCH ASSEMBLY PARTICULARLY ADAPTED FOR USE WITH FIBER OPTIC LIGHT SOURCES

[75] Inventors: Richard E. Feinbloom; Melvin Levine, both of New York, N.Y.

[73] Assignee: Designs for Vision, Inc., New York, N.Y.

[21] Appl. No.: 414,466

[22] Filed: Sep. 2, 1982

[51] Int. Cl.³ .............................................. F21V 7/04
[52] U.S. Cl. ...................................... 362/32; 362/20; 362/254; 362/227; 362/232; 362/250; 362/372; 362/802; 362/804; 353/87
[58] Field of Search .................. 353/87; 362/20, 254, 362/32, 227, 250, 232, 802, 804

[56] References Cited

U.S. PATENT DOCUMENTS

| | | | |
|---|---|---|---|
| 2,289,315 | 7/1942 | MacKay | 362/20 |
| 2,810,819 | 10/1957 | Gibson | 362/7 |
| 3,959,612 | 5/1976 | Feinbloom | 200/51.03 |

Primary Examiner—Stephen J. Lechert, Jr.
Assistant Examiner—Joel P. Okamoto
Attorney, Agent, or Firm—Arthur L. Plevy

[57] ABSTRACT

A linear switch assembly comprises a planar plate secured to the inner wall of a housing for a light source. A carriage member has a first slot positioned within the edge of the plate member and a second shorter slot on a top adjacent surface. The plate has an extending rigid rod positioned within the second slot to allow the carriage to move along the plate member in a linear direction. Associated with the carriage member are first and second lamp assemblies each having an associated actuatable switch. As the carriage is moved the rod coacts with an operating lever associated with each switch to actuate the switch when the associated lamp assembly is moved into a proper position whereby power is supplied to each lamp assembly only when at the proper operating position.

10 Claims, 4 Drawing Figures

LINEAR MOTION SWITCH ASSEMBLY PARTICULARLY ADAPTED FOR USE WITH FIBER OPTIC LIGHT SOURCES

BACKGROUND OF INVENTION

This invention relates to a switch assembly and more particularly to a linear motion switch assembly adapted to selectively energize and properly position any one of two lamps from a single power source and to assure that the lamp selected is properly aligned with respect to an optical system.

The prior art is well aware of the problem of employing a plurality of back-up bulbs or lamps to provide quick replacement of the one being utilized if a failure occurs. Such techniques provide a minimum down-time for the optical system to enable one to rapidly replace a failed lamp by a switching action instead of actually removing the lamp from the socket and replacing the same.

It is also apparent that when one employs such a back-up lamp source in a relatively accurate optical system, one must be assured that a selected lamp or bulb will move into proper registration with either a lens system or an outlet aperture to assure and maintain optical system performance.

The prior art is replete with a number of patents and techniques which allow one to switch lamps without removing a failed unit from its socket or holder. A particularly useful approach is depicted in U.S. Pat. No. 3,959,612 issued on May 25, 1976 entitled ROTARY SWITCH ASSEMBLY PARTICULARLY ADAPTED FOR USE WITH FIBER OPTIC LIGHT SOURCES by Richard E. Feinbloom and assigned to the assignee herein. This patent gives examples of various other patents as prior art which are pertinent to the general problem of switching a defective bulb.

As indicated in that patent, a particular important reason for providing such structure is necessitated by the constraints imposed in a medical or dental procedure. In regard to such procedures a "cold light" source is employed during a surgical or operating room procedure. Essentially, the cold light source comprises a fiber optic cable which is illuminated by a high intensity, high wattage lamp. The filament of the light source or lamp is positioned to illuminate an inlet port of the fiber optic cable, which cable may be a few feet or more in length. The lamp or light source is housed in a suitable enclosure, where, because of its high power dissipation, it produces substantial amounts of heat. As such the lamp and housing have to be cooled by means of a fan or other suitable arrangement.

The surgeon or dentist uses the fiber optic cable as a light source and he can therefore direct the light emanating from the outlet end of the fiber cable to any desired position. Since the fiber optic cable is a good conductor of light and because of the optical properties it does not conduct the heat generated by the lamp in the enclosure. Hence the term "cold-light" source has been used to describe such a device.

The amount of light needed for surgical procedures as well as dental procedures is substantial. Due to this fact lamp sources such as halogen, xenon or other high intensity lamps are employed. These lamps operate at high wattage and have a relatively small average life which may be between 10 to 30 hours.

Based on these considerations the lamp or bulb can be expected to fail during use, which in the case of a surgical or dental procedure may endanger the patient as unduly delaying the operation.

Thus the failure of a light source during such a procedure can seriously endanger the operating technique and place the patient in a hazardous position. Moreover, due to the extreme heat generated by the assembly, it becomes difficult to physically replace the unit until it cools. Furthermore, there is always the possibility that another lamp or bulb is not available hence creating further difficulty.

Apart from such considerations is the fact that the bulb cannot be merely replaced as one would do in a typical fixture.

As indicated, the alignment of the optical axis of the bulb with the inlet of the fiber cable is important, so that the light is properly directed to provide a desired output pattern. Therefore, the switching assembly is accurately fabricated to assure that each bulb is properly aligned to enable selection of either bulb within the housing.

The above noted problems are described in U.S. Pat. No. 3,959,612 which shows apparatus solving the problems. In the apparatus according to that patent a rotary switch is employed which switch allows one to select any one of four bulbs.

While the apparatus is reliable it is relatively expensive and complicated and offers a great deal of back-up which is not necessary in many typical procedures, as for example, in the field of dentistry.

It is therefore an object of the present invention to provide an improved switching assembly for selecting one of two lamp assemblies in a simple and rapid manner while assuring that the selected unit is in proper alignment when selected as being optimumly positioned with respect to the fiber optic cable and the light source housing.

BRIEF DESCRIPTION OF THE PREFERRED EMBODIMENT

A switch assembly for selecting one of a first and second lamp assembly, comprises a carriage member having a first slot in one side wall thereof, with said slot directed from the top to the bottom surface of said member, said member having a second slot in an adjacent sidewall with said second slot parallel to said first slot and of a shorter length, a planar rigid plate member with one edge of said member positioned within said first slot to allow said carriage member to move along said planar member as guided by said edge, an extending rod secured to said planar plate member and extending through said second slot for defining a linear path of motion for said carriage member, first and second actuatable switching means positioned on said carriage member with said first switching means located near one end of said second slot and said second switching means located near the opposite end of said second slot, with said switching means adapted to be actuated by said rod when said carriage member is moved along said planar member, first and second lamp assemblies each associated with a separate one of said switches whereby when said carriage is moved along said planar member a separate one of said switching means is actuated to illuminate said associated lamp assembly.

DETAILED DESCRIPTION OF THE FIGURES

Figure 1:
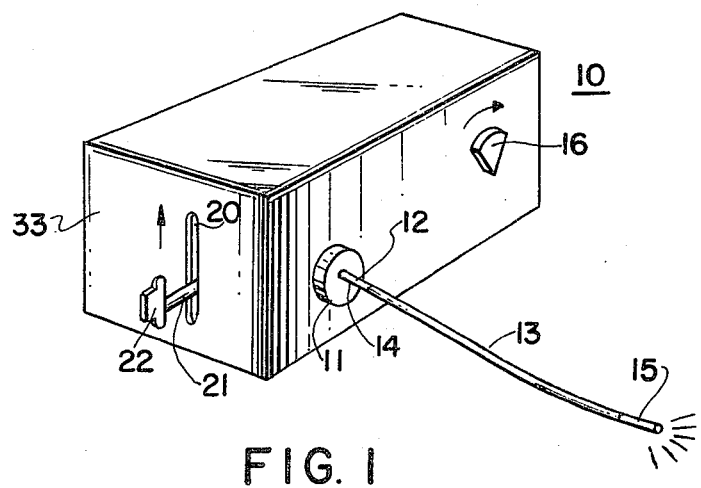
FIG. 1 is a perspective plan view of a fiber optic light source useful with this invention.

Referring to FIG. 1, there is shown a perspective plan view of a typical fiber optic light source assembly and housing 10.

The housing 10 is fabricated from a metal and is generally a rectangular box-like structure. The housing 10 has a front surface including a chuck or fixture 11 into which the inlet end 12 of a fiber optic cable 13 can be inserted. The chuck 11 has a central aperture 14 which is aligned with the optical axis of the filament of a high intensity bulb located within the hollow of the housing 10. The light emanating from the bulb is directed via the cable 13 to the outlet end 15. A knob or intensity control 16 is also positioned on the front panel and is employed to alter or vary the intensity of the light and therefore the magnitude of light available at the output end 15 of the fiber cable 13.

The length of the fiber cable 13 can vary but the cable is typically between 6 to 7.5 feet long and comprises a plurality of individual fiber optic cables arranged in a bundle. As is known, such cables can transmit light with good efficiency and because of the structure, the cable can be bent in multiple positions or flexed without disrupting the output light pattern.

While the cable 13 can be used as an illuminating source it can also be inserted into a headlight arrangement to be worn about the head of the surgeon or dentist and thus enable him to illuminate areas of concern without the use of his hands. Such headlight arrangements and structures are known in the field and different types are sold and offered for sale by the assignee herein.

Also shown on the side surface of the housing 10 is an elongated vertical slot 20. Directed from the slot 20 is a planar control arm or switching member 21 having a knob 22. As will be explained, when the knob 22 is accessed and the arm 21 is moved upwardly, the user can select a back-up bulb if the existing bulb fails. Upon completion of this simple action a new lamp is moved into alignment with the aperture 14 of the fixture 11 and hence will illuminate the cable 13 in a similar manner as did the first lamp prior to failure.

Figure 2:
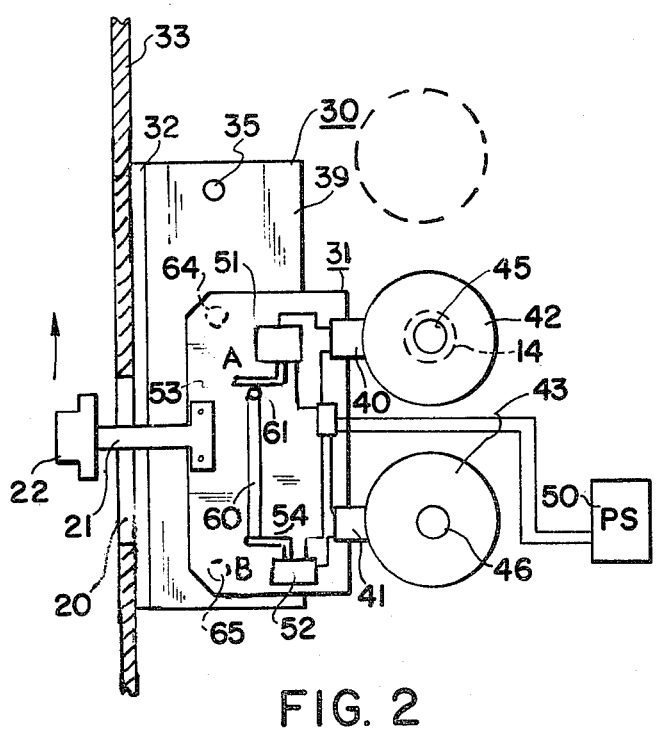
FIG. 2 is a front plan view of a linear motion switch assembly according to this invention.

Referring to FIG. 2, there is shown a front plan view of a linear switch apparatus according to this invention.

Figure 4:
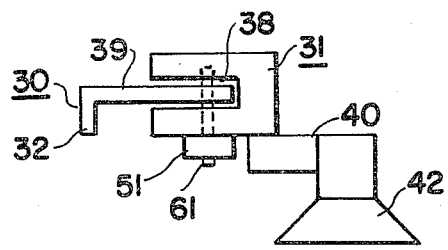
FIG. 4 is a top plan view of the switch assembly according to this invention.

The switch apparatus consists of two main parts, namely an "L" shaped bracket 30 and a slotted carriage 31. The outer flange 32 of bracket 30 is secured to the sidewall 33 of the housing 10. The bracket 30 has a top and bottom recess as 35A,B,C which serves as a detent stop to limit the motion of the carriage 31 during a switching operation. As seen in FIG. 4, the carriage 31 has a slot 38 which is of a "U" shaped configuration and which is positioned about the other arm 39 of the bracket 30. The arm 39 is a planar surface and acts as a guide for the carriage 31. The planar arm 21 (FIG 1) with the control knob 22 is secured to the carriage assembly 31.

It should be apparent that as the arm 21 is lifted vertically, the carriage 31 will move along the rigid flange member 30. Located on the carriage 31 are first and second sockets 40 and 41. Each socket accomodates a light source as 42 and 43. The light sources or bulb structures 42 and 43 include a suitable reflector with the lamps 45 and 46 arranged at the center of the reflector. The design of the assembly is such that the optical axis passes through the geometric center of the filament of lamp housing and has a predetermined focal length. Shown in dashed line is the aperture 14 associated with the front panel of the housing and centered with the chuck or fixture 11. Thus in FIG. 2 the lamp assembly 42 is optically aligned with the aperture 14. When the carriage is moved to select the other lamp assembly 43, the assembly 43 becomes optically aligned with the aperture 14.

Each socket 40 and 41 has one terminal directly connected via a suitable length of wire to a terminal of a power supply 50. The other terminal of each socket 40 and 41 is connected via switches 51 and 52 to the other terminal of the power supply 50. Switches 51 and 52 are mechanically lever operated single pole-single throw switches. Many examples of such switches exist and are known in the prior art. The switches as 51 and 52 each have extending lever arms 53 and 54. When the arm is pushed towards the switch body contact is made to thus connect the power source terminal to the socket terminal. Examples of such switches are sold by many companies including the Honeywell Company under the name of MICROSWITCH.

The top surface of the carriage 31 has an elongated slot 60. The slot 60 is parallel to slot 38 and is located on an adjacent surface. The slot 60 has a top end A and a bottom end B and does not go from the top to bottom surfaces as does slot 38. Secured to the flange surface 39 is an extending pin or rod 61, which rides within the slot 60 in the top surface of the carriage 31. In the position shown in FIG. 2, the rod 61 is coacting with the lever 53 of switch 51. This causes the lamp assembly 42 to be energized. The entire assembly is held in this position by means of a simple detent assembly as depicted in FIG. 3.

The carriage member 31 is generally rectangular in shape with the longer sidewall containing the slot or channel 38 and which slot is directed from the top to the bottom surface of the member 31. The slot 60 is a partial slot and is located on an adjacent sidewall. The slot 60 communicates with the slot 68 to allow the rod 61 to control movement of the carriage with respect to the edge of the planar arm 39 of the bracket 30.

Thus the planar member 39 serves as a guide rail for the carraige member 31, with the slot 38 "riding" along the outer edge of the planar member 31 as shown.

Figure 3:
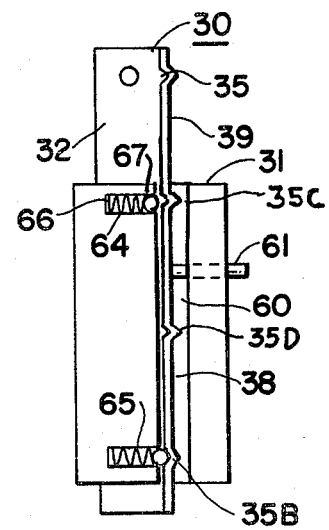
FIG. 3 is a partial side view in diagrammatic form depicting a carriage and flange assembly employed in the switch assembly.

As seen in FIG. 3, the carriage assembly 31 has first and second apertures 64 and 65. Each aperture contains a spring 66 and a ball 67 as a ball bearing. This arrangement allows the carriage 31 to be easily moved as when the arm 21 is lifted the balls roll or ride along the surface of the flange. The flange surface 39 has detent recesses as 35 of FIG. 2 and 65 of FIG. 3. When the associated ball overlies the recess it is forced or pushed into the same by the spring action. This gives the user a positive "feel" or indication that the switch has been moved to the desired position.

With the above description in mind, assume that bulb 45 burns out, the usual cause of bulb failure. The operator then grasps the knob 22 and moves the same toward the opposite end of the slot 20. By exerting a slight force, the ball detents will dislodge from recesses 65 and the carriage 31 moves upwardly. The rod 61 releases lever 53 and hence power is removed from assembly 42.

When the carriage is moved, the proper position the ball detents 65 and 66 coact with recess 35, the rod 61 engages the lever 54 of witch 52 to energize the lamp. When this occurs, the optical axis of bulb 46 is aligned with the aperture 14 and the failed lamp bulb 45 is moved to the dashed line position.

Thus the simple linear vertical movement automatically replaces the failed assembly 42 with the back-up assembly 43. This is done rapidly and reliably while assuring proper alignment and registration. Power is applied via the switch as engaged by the rod 61. The new lamp assembly while being in proper registration is also at the position to enable it to receive the maximum cooling effects from the cooling system as the fan assembly also continued within the housing 10 but not shown.

As seen from FIG. 3, when the assembly is in the top or bottom position, the balls associated with the apertures 64 and 65 contact the respective detents as 35B and 35C. Thus for each position shown two detents are contacted by the balls. The lamp being used is always in proper position when the detents are coacted.

In summation, there is shown and described a simple, reliable and accurate switch which switch is operated by a linear motion to enable a failed lamp assembly to be replaced by a back-up assembly. The arrangement supplies power when the new assembly is in the proper position. In this manner, both lamp assemblies are properly aligned as controlled by the detent mechanisms and the general structure shown and described.

We claim:

1. A switch assembly for selecting one of a first and second lamp assembly, comprising:
   (a) a carriage member having a first slot in one sidewall thereof, with said slot directed from the top to the bottom surface of said member, said member having a second slot in an adjacent sidewall with said second slot parallel to said first slot and of a shorter length,
   (b) a planar rigid plate member with one edge of said member positioned within said first slot to allow said carriage member to move along said planar member as guided by said edge,
   (c) an extending rod secured to said planar plate member and extending through said second slot for defining a linear path of motion for said carriage member,
   (d) first and second actuatable switching means positioned on said carriage member with said first switching means located near one end of said second slot and said second switching means located near the opposite end of said second slot, with said switching means adapted to be actuated by said rod when said carriage member is moved along said planar member,
   (e) first and second lamp assemblies each associated with a separate one of said switches whereby when said carriage is moved along said planar member a separate one of said switching means is actuated to illuminate said associated lamp assembly.

2. The switch assembly according to claim 1, further including an extending arm coupled to said carriage assembly for moving the same along said edge.

3. The switch assembly according to claim 1, further including top and bottom detent coacting means located on said carriage assembly for defining a first and second position indicative of actuating said first and second lamp assemblies, with detent means positioned on said planar member indicative of said first and second positions by coacting with said detent coacting means.

4. The switch assembly according to claim 1, wherein each of said actuatable switching means is associated with a separate lever, with one of said levers positioned near the top end of said second slot and the other lever near the bottom end of said slot, each of said levers when coacted adapted to operate said associated switching means, with said levers as positioned adapted to coact with said rod when said carriage member moves along said planar member to select either said first or second lamp assembly.

5. The switch assembly according to claim 2, wherein said detent coacting means located on said carraige member includes first and second apertures located on the surface of said carriage member with said first aperture near the top end of said second slot and the second aperture located near the bottom end of said second slot, a spring located in each aperture with a ball positioned on said spring near the top of said aperture to cause said ball to roll as said carriage is moved along said planar member, with first and second recesses positioned on said planar member defining a first and second carriage position to cause one ball to be pushed via said spring into one of said recesses for said first position indicative of selecting a first lamp assembly and to cause said other ball to be pushed into said second recess for said second position indicative of selecting the second lamp assembly.

6. The switch assembly according to claim 1, wherein said planar plate member is an "L" shaped bracket, with one arm of said bracket manifesting said planar plate member with the outer edge thereof positioned within said first slot of said carriage member.

7. The switch assembly according to claim 1, wherein each of said first and second lamp assemblies includes an associated socket for accommodating a high intensity lamp.

8. The switch assembly according to claim 1, further including a hollow housing with said planar plate member rigidly positioned within said housing to allow said carriage member to move along said planar member within said housing, said housing having a slot in a sidewall thereof with a control arm positioned in said slot and coupled to said carriage member, said housing further having an aperture in a surface adjacent to said sidewall with said aperture positioned with respect to said carriage assembly to propagate light therethrough whereby when said carriage is in said first or second position said aperture propagates light from said first or second lamp assemblies.

9. The switch assembly according to claim 1, wherein when said carriage member is moved along said planar member said lamp assemblies are positioned so that said rod will actuate said associated switching means to illuminate said associated lamp always at the same position with respect to said planar member.

10. The switch assembly according to claim 8, further including a fiber optic cable coupled to said furface of said housing and having its optical axis aligned with said aperture to allow said cable to receive light propagating through said apperture.

* * * * *